United States Patent
Byron et al.

(10) Patent No.: US 10,636,186 B2
(45) Date of Patent: *Apr. 28, 2020

(54) FILLING IN AN ENTITY WITHIN A VIDEO

(71) Applicant: International Business Machines Corporation, Armonk, NY (US)

(72) Inventors: Donna K. Byron, Petersham, MA (US); Carmine Dimascio, West Roxbury, MA (US); Florian Pinel, New York, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/831,142

(22) Filed: Dec. 4, 2017

(65) Prior Publication Data

US 2019/0172237 A1 Jun. 6, 2019

(51) Int. Cl.
*G06T 11/60* (2006.01)
*H04L 29/08* (2006.01)
*G06T 5/00* (2006.01)

(52) U.S. Cl.
CPC .............. *G06T 11/60* (2013.01); *G06T 5/005* (2013.01); *G06T 2207/10016* (2013.01); *H04L 67/10* (2013.01)

(58) Field of Classification Search
CPC ........... G06T 7/00; G06T 11/60; G06T 19/00; G06K 9/62; G06K 2209/00; G06F 3/0484
USPC ........ 345/619, 621, 624; 382/181, 190, 195, 382/199, 203, 276, 285; 715/700
See application file for complete search history.

(56) References Cited

U.S. PATENT DOCUMENTS

| | | | |
|---|---|---|---|
| 5,990,901 A * | 11/1999 | Lawton | G06T 15/503 345/581 |
| 8,478,055 B2 | 7/2013 | Hosoi | |
| 8,605,992 B2 | 12/2013 | Kohli et al. | |
| 8,731,324 B1 | 5/2014 | Huang et al. | |
| 8,749,580 B1 * | 6/2014 | Lininger | G11B 27/322 345/629 |
| 8,861,868 B2 | 10/2014 | Shechtman et al. | |
| 8,866,883 B2 | 10/2014 | Rohaly et al. | |
| 9,277,969 B2 | 3/2016 | Brannan et al. | |
| 9,350,969 B2 | 5/2016 | Cohen et al. | |
| 9,380,286 B2 | 6/2016 | Cohen et al. | |
| 9,501,720 B2 | 11/2016 | Kamiya | |
| 9,626,798 B2 * | 4/2017 | Zavesky | H04N 21/21805 |
| 2004/0165787 A1 * | 8/2004 | Perez | G06T 11/001 382/284 |
| 2008/0238942 A1 | 10/2008 | Sun et al. | |
| 2008/0260240 A1 * | 10/2008 | Vukosavljevic | G06K 9/00436 382/159 |

(Continued)

OTHER PUBLICATIONS

Byron et al., U.S. Appl. No. 15/831,090, filed Dec. 4, 2017.

(Continued)

*Primary Examiner* — Jacinta M Crawford

(74) *Attorney, Agent, or Firm* — Zilka-Kotab, P.C.

(57) ABSTRACT

A computer-implemented method according to one embodiment includes identifying an entity to be filled in within a selected plurality of video frames, determining a three-dimensional (3D) model for the entity, and filling in the entity within the selected plurality of video frames, utilizing the 3D model.

15 Claims, 6 Drawing Sheets

(56) References Cited

U.S. PATENT DOCUMENTS

| | | | |
|---|---|---|---|
| 2009/0096808 A1* | 4/2009 | Winn | G06T 11/60 345/594 |
| 2010/0177978 A1 | 7/2010 | Jeong et al. | |
| 2010/0296748 A1 | 11/2010 | Shechtman et al. | |
| 2011/0193861 A1 | 8/2011 | Mashitani et al. | |
| 2013/0300830 A1* | 11/2013 | Solem | G06F 17/30241 348/46 |
| 2014/0229143 A1* | 8/2014 | Cohen-Or | G06T 17/10 703/1 |
| 2014/0309027 A1* | 10/2014 | Ichimura | A63F 13/10 463/31 |
| 2015/0097827 A1 | 4/2015 | Cohen et al. | |
| 2015/0178321 A1* | 6/2015 | Rivlin | G06F 17/30277 707/728 |
| 2015/0325038 A1* | 11/2015 | Baker | G06T 15/205 345/426 |
| 2016/0005211 A1* | 1/2016 | Sarkis | G06T 19/00 345/419 |
| 2016/0055268 A1 | 2/2016 | Bell et al. | |
| 2017/0076508 A1* | 3/2017 | VanBlon | G09G 5/006 |
| 2017/0278308 A1* | 9/2017 | Bleiweiss | G06T 19/20 |
| 2017/0345193 A1* | 11/2017 | Peterson | G06T 11/60 |
| 2019/0172236 A1 | 6/2019 | Byron et al. | |
| 2020/0020147 A1 | 1/2020 | Byron et al. | |
| 2020/0058146 A1 | 2/2020 | Byron et al. | |

OTHER PUBLICATIONS

List of IBM Patents or Patent Applications Treated As Related.
Allen et al., "Generative Adversarial Denoising Autoencoder for Face Completion," Georgia College of Tech Computing, 2017, pp. 1-9, retrieved from http://www.cc.gatech.edu/~hays/7476/projects/Avery_Wenchen/.
Wikipedia, "Edge detection," Oct. 2017, pp. 1-9, retrieved from https://en.wikipedia.org/wiki/Edge_detection.
Wikipedia, "Image registration," Oct. 2017, pp. 1-5 https://en.wikipedia.org/wiki/Image_registration.
photoshop essentials.com, "Photoshop CS5 New Features—Content Aware Fill Tutorial," 2017, 2 pages, retrieved from http://www.photoshopessentials.com/photo-editing/content-aware-fill-cs5/.
Mell et al., "The NIST Definition of Cloud Computing," NIST Special Publication 800-145, Sep. 2011, 7 pages.
Mell, et al., "The NIST Definition of Cloud Computing," Information Page, Version 15, Oct. 7, 2009, 2 pages.
NIST, "NIST Cloud Computing Program," Information Technology Laboratory webpage, last updated Nov. 13, 2013, 3 pages.
Final Office Action from U.S. Appl. No. 15/831,090, dated Mar. 21, 2019.
Non-Final Office Action from U.S. Appl. No. 15/831,090, dated Sep. 4, 2018.
Notice of Allowance from U.S. Appl. No. 15/831,090, dated Jun. 10, 2019.
Notice of Allowance from U.S. Appl. No. 15/831,090, dated Aug. 9, 2019.
Byron et al., U.S. Appl. No. 16/584,550, filed Sep. 26, 2019.
Byron et al., U.S. Appl. No. 16/661,874, filed Oct. 23, 2019.
Non-Final Office Action from U.S. Appl. No. 161584,550, dated Nov. 1, 2019.
Notice of Allowance from U.S. Appl. No. 15/831,090, dated Nov. 20, 2019.
Non-Final Office Action from U.S. Appl. No. 16/661,874, dated Nov. 29, 2019.

* cited by examiner

FILLING IN AN ENTITY WITHIN A VIDEO

BACKGROUND

The present invention relates to image and video correction, and more specifically, this invention relates to identifying and repairing undesired elements within a displayed image or video.

Video and image editing tools are commonly used to edit and repair images and video. However, current editing tools perform poorly when used to repair undesired elements having irregular structures (e.g., cars, people, etc.) within associated images and video.

SUMMARY

A computer-implemented method according to one embodiment includes identifying an entity to be filled in within a selected plurality of video frames, determining a three-dimensional (3D) model for the entity, and filling in the entity within the selected plurality of video frames, utilizing the 3D model.

According to another embodiment, a computer program product for filling in an entity within a video includes a computer readable storage medium having program instructions embodied therewith, where the computer readable storage medium is not a transitory signal per se, and where the program instructions are executable by a processor to cause the processor to perform a method comprising identifying the entity to be filled in within the selected plurality of video frames, utilizing the processor, determining a three-dimensional (3D) model for the entity, utilizing the processor, and filling in the entity within the selected plurality of video frames, utilizing the 3D model and the processor.

A system according to another embodiment includes a processor, and logic integrated with the processor, executable by the processor, or integrated with and executable by the processor, where the logic is configured to identify an entity to be filled in within a selected plurality of video frames, determine a three-dimensional (3D) model for the entity, and fill in the entity within the selected plurality of video frames, utilizing the 3D model.

Other aspects and embodiments of the present invention will become apparent from the following detailed description, which, when taken in conjunction with the drawings, illustrate by way of example the principles of the invention.

DETAILED DESCRIPTION

Figure 1:
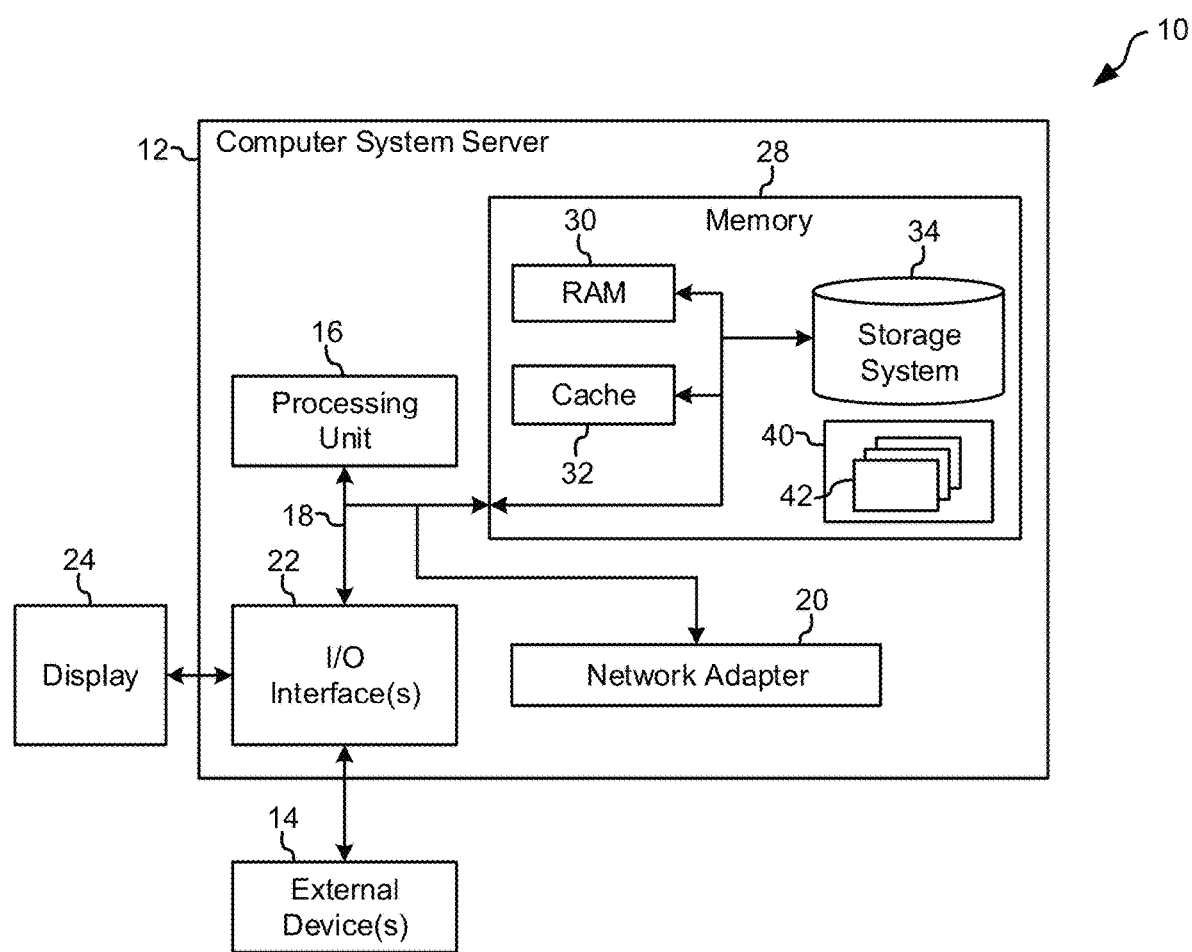
FIG. 1 depicts a cloud computing node according to an embodiment of the present invention.

The following description discloses several preferred embodiments of systems, methods and computer program products for filling in an entity within an image. Various embodiments provide a method to identify an entity to be filled in within an image, determine a 3D model associated with the entity, and fill in the entity, utilizing the 3D model.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for filling in an entity within an image.

In one general embodiment, a computer-implemented method includes identifying an entity to be filled in within an image, determining a three-dimensional (3D) model for the entity, and filling in the entity within the image, utilizing the 3D model.

In another general embodiment, a computer program product for filling in an entity within an image includes a computer readable storage medium having program instructions embodied therewith, where the computer readable storage medium is not a transitory signal per se, and where the program instructions are executable by a processor to cause the processor to perform a method comprising identifying the entity to be filled in within the image, utilizing the processor, determining a three-dimensional (3D) model for the entity, utilizing the processor, and filling in the entity within the image, utilizing the 3D model and the processor.

In another general embodiment, a system includes a processor, and logic integrated with the processor, executable by the processor, or integrated with and executable by the processor, where the logic is configured to identify an entity to be filled in within an image, determine a three-dimensional (3D) model for the entity, and fill in the entity within the image, utilizing the 3D model.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
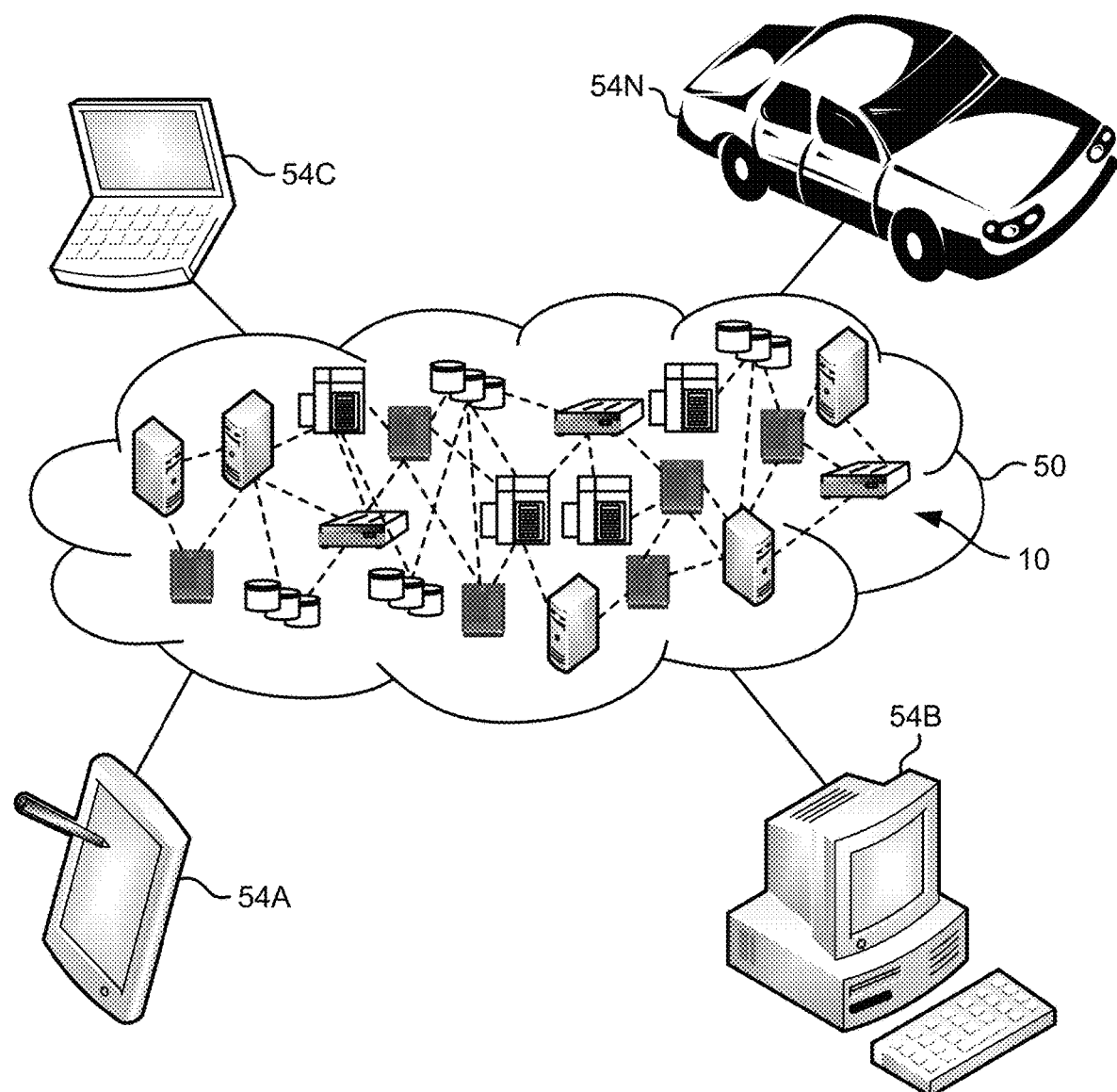
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
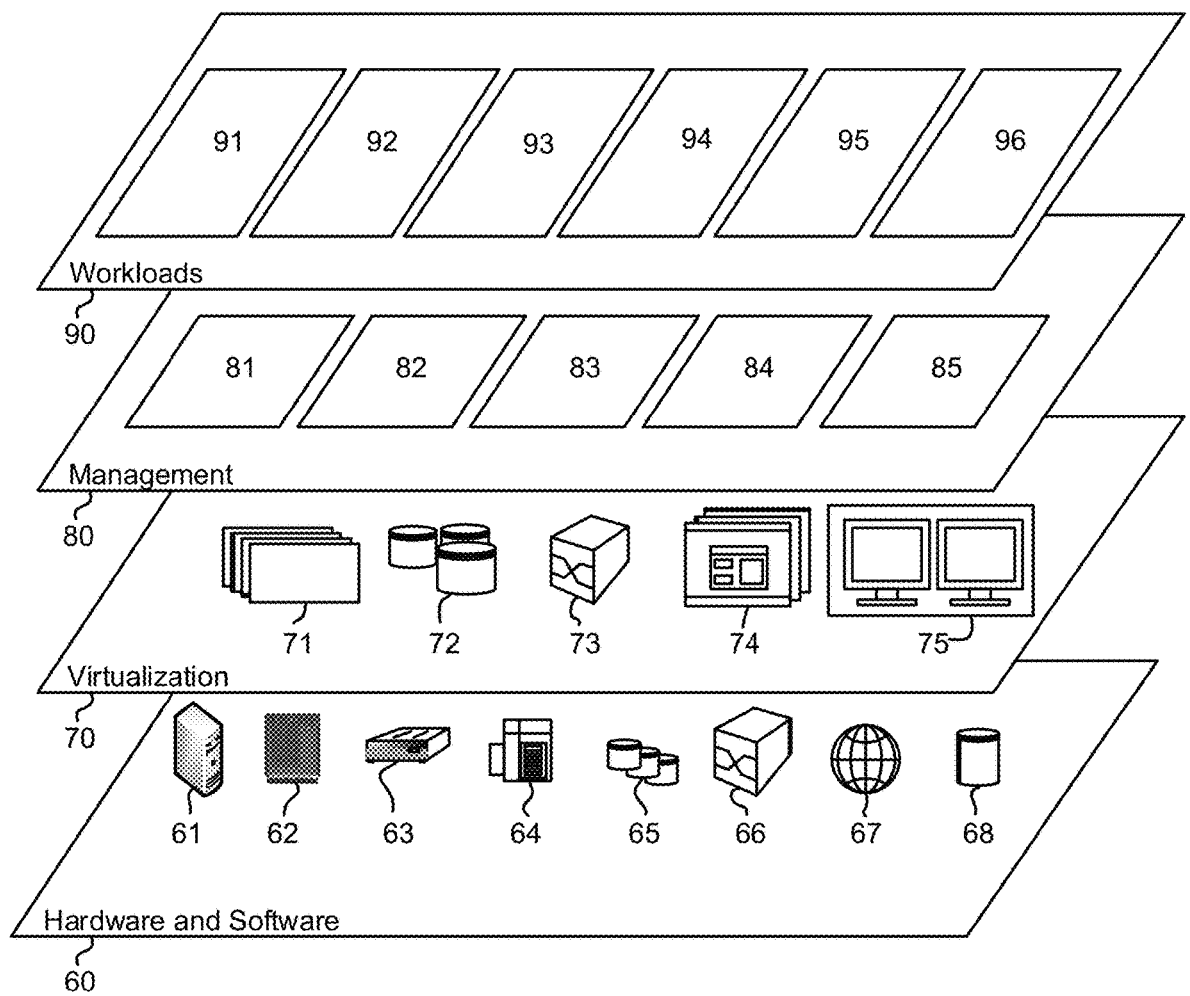
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and card stunt as a service (CaaS) 96.

Figure 4:
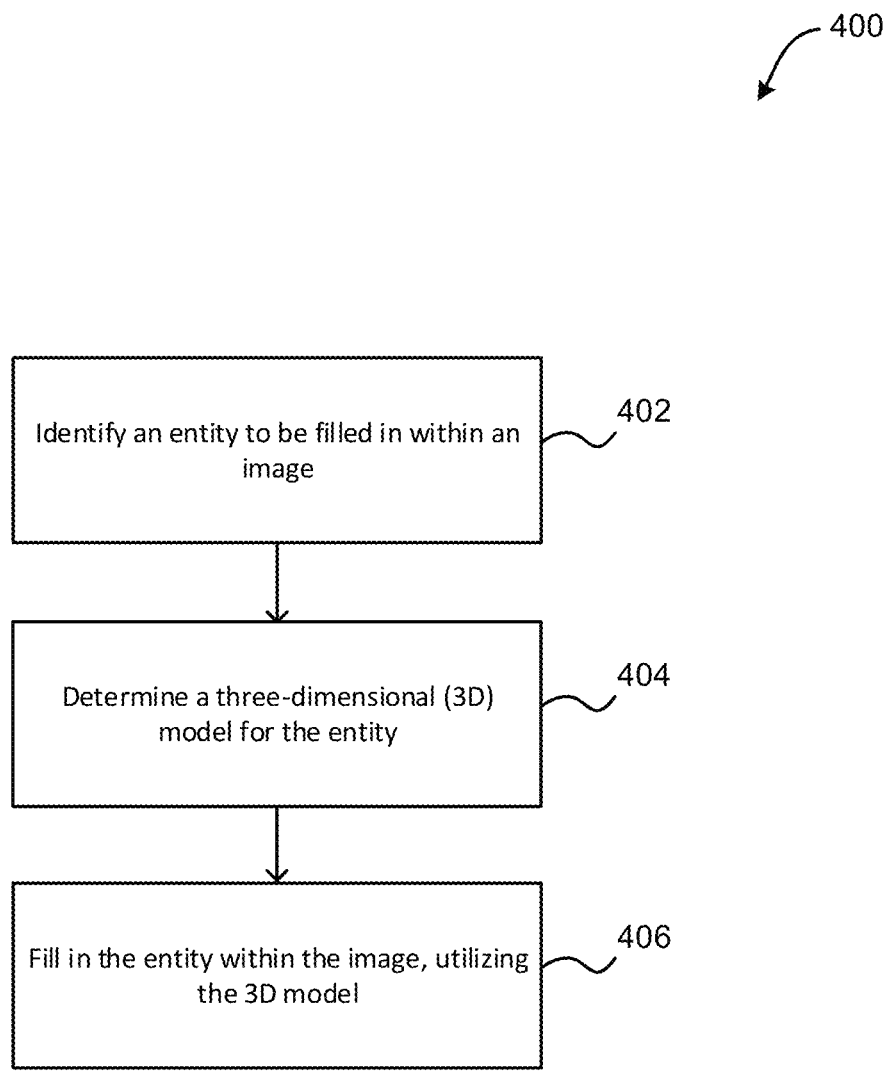
FIG. 4 illustrates a method for filling in an entity within an image, in accordance with one embodiment.

Now referring to FIG. 4, a flowchart of a method 400 for filling in an entity within an image is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an entity to be filled in within an image is identified. In one embodiment, the image may include a photograph, a digitally created image, etc. For example, the image may be a portion of a video (e.g., a frame of the video, etc.), a virtual reality image, etc. In another embodiment, the entity may be identified within an image editing application. In yet another embodiment, the entity may be identified in real-time during replay.

Additionally, in one embodiment, the entity may include an object included within the image. In another embodiment, the entity may be identified as an object with an irregular structure. For example, the entity may match one or more stored 3D models that are classified as irregular structures. In another example, the 3D models may be stored locally and/or globally (e.g., shared by a plurality of users). In yet another example, the entity may include a vehicle shown within the image, a human or animal body shown within the image, a face shown within the image, etc.

Further, in one embodiment, the entity may be identified in response to user feedback. For example, a first attempt may be made to fill in an area of the image including the entity (e.g., utilizing a tool within the image editing application for filling in regular structures), but it may be detected that the results of the first attempt have been undone by a user of the application.

In another embodiment, the entity to be filled in may be incomplete, may have one or more missing portions, etc. For example, portions of the entity may be missing as shown within the image (such as missing/empty pixels within the entity, etc.). In another example, the one or more missing/empty portions may result from one or more actions that have been performed on the image. For instance, the image may be corrected for perspective and/or distortion, which may result in the one or more missing/empty portions within the image that may need to be corrected through filling.

Further still, in one embodiment, the entity may be identified in response to a selection of a portion of the image by the user. For example, the user may select a defined area within the image (e.g., to be filled in, etc.). In another example, the entity may be located within the defined area. In another embodiment, the entity may be identified utilizing one or more image recognition techniques. For example, the image recognition may be implemented utilizing one or more image recognition algorithms. In another example, the image recognition may be implemented utilizing one or more neural networks. In yet another example, the image recognition may be implemented utilizing one or more object detection APIs.

Also, in one embodiment, the one or more image recognition techniques may utilize local image data to refine results. For example, images stored locally on a user's device may be used during image recognition to assist in identifying the entity. In another embodiment, the results of the one or more image recognition techniques may include metadata associated with the entity. For example, the metadata may include an identification of the entity (e.g., whether the entity is a person, a vehicle, etc.). In another example, the metadata may include a classification of the entity (e.g., a type of vehicle (boat, car, plane, etc.)). In yet another example, the metadata may include one or more specific characteristics of the entity. For instance, the metadata may include any branding/labels that are identified as part of the entity (e.g., license plate, model badge, etc.), a type of the entity, etc.

In addition, in one embodiment, additional metadata may be associated with the image. For example, the metadata may include a date and/or time the image was created (e.g., a time/date stamp, etc.). In another example, the metadata may include a geographical location where the image was created (e.g., a geo tag associated with an image taken by a camera, etc.). In another embodiment, the identifying may be performed within an individual computing device and/or at a cloud computing environment.

Furthermore, as shown in FIG. 4, method 400 may proceed with operation 404, where a three-dimensional (3D) model is determined for the entity. In one embodiment, determining the 3D model may include using edge detection to determine one or more contours of the entity within the image. For example, edge detection may be implemented utilizing the one or more image recognition techniques, utilizing a separate edge detection application, etc.

Further still, in one embodiment, determining the 3D model may include retrieving one or more 3D models from a model library. For example, the 3D models may be retrieved utilizing the identification of the entity. In another example, the 3D models may be retrieved utilizing metadata associated with the entity, additional metadata associated with the image, etc. In another embodiment, the model library may include a database of 3D models shared by a plurality of users. For example, the model library may be locally or remotely based. In another example, the model library may be contributed to and shared by a plurality of different users. In yet another example, each model within the library may be associated with various metadata describing characteristics of the model.

Also, in one embodiment, the 3D models may each include a wireframe model. In another embodiment, one or more of the 3D models may be associated with one or more textures. In yet another embodiment, determining the 3D model may include refining the models retrieved from the library to determine the 3D model. For example, a plurality of different models may be returned from the library. In another example, the 3D model may be selected from the plurality of different models, utilizing the additional metadata associated with the image. In this way, the results may be refined utilizing information associated with the image, such as time and location information.

Additionally, in one embodiment, the determining may be performed within an individual computing device and/or at a cloud computing environment.

Further, as shown in FIG. 4, method 400 may proceed with operation 406, where the entity is filled in within the image, utilizing the 3D model. In one embodiment, filling in the entity may include applying a transformation to the 3D model. For example, a transformation may be applied to the 3D model to manipulate the model so that it matches a shape and viewing angle of the entity. In another example, the transformation may be applied using one or more image registration techniques.

Further still, in one embodiment, filling in the entity may include using the transformation to project the 3D model onto a selected area within the image that needs to be filled (e.g., one or more missing portions of the entity, etc.). In another embodiment, filling in the entity may include mapping each surface of the 3D model to the image. For example, the 3D model of the entity may be mapped to its 2D representation within the image, utilizing image registration. In another example, the surfaces of the 3D model may include one or more characteristics of the 3D model (e.g., for a car, the surfaces may include one or more windows, wheels, doors, etc.).

Also, in one embodiment, filling in the entity may include applying a texture to the portions of the surface that need to be filled. For example, the texture may be learned from a texture of an adjacent surface outside of the fill area. In another example, the texture may be learned from other images (e.g., related images within a local or shared database). In yet another example, the texture may be learned from other entities within the image. In still another example, the texture may be associated with the 3D model itself.

In addition, in one embodiment, one or more areas around the entity (e.g., areas within the portion of the image selected by the user) may also be filled in. For example, these areas may be filled in utilizing a tool within the image editing application for filling in regular structures. In another embodiment, filling in the entity may result in a reconstructed entity within a reconstructed image.

Furthermore, in one embodiment, the reconstructed entity within the image may be validated. For example, image recognition may be performed on the reconstructed entity and/or the image. In another example, a first confidence score may be obtained as a result of the image recognition. In yet another example, the first confidence score for the reconstructed image may be compared to a second confidence score previously obtained for the original image. In still another example, if the first confidence score is not higher than the second confidence score, a different 3D model may be determined for the entity and used for filling in the entity.

Further still, in one embodiment, validating the reconstructed entity may include identifying user feedback. For example, it may be detected whether the filling in of the entity has been undone by a user of the application. In another embodiment, if the filling has been undone, a different 3D model may be determined for the entity and used for filling in the entity. In yet another embodiment, the filling may be performed within an individual computing device and/or at a cloud computing environment. Also, in one embodiment, the entity may be identified and filled in within a plurality of images (e.g., a plurality of frames of a video, etc.), utilizing one or more of the techniques described above.

In this way, incorrect and/or missing pixels associated with the entity may be filled in, utilizing a 3D model that is retrieved for the entity based on an identification of the entity within the image.

Figure 5:
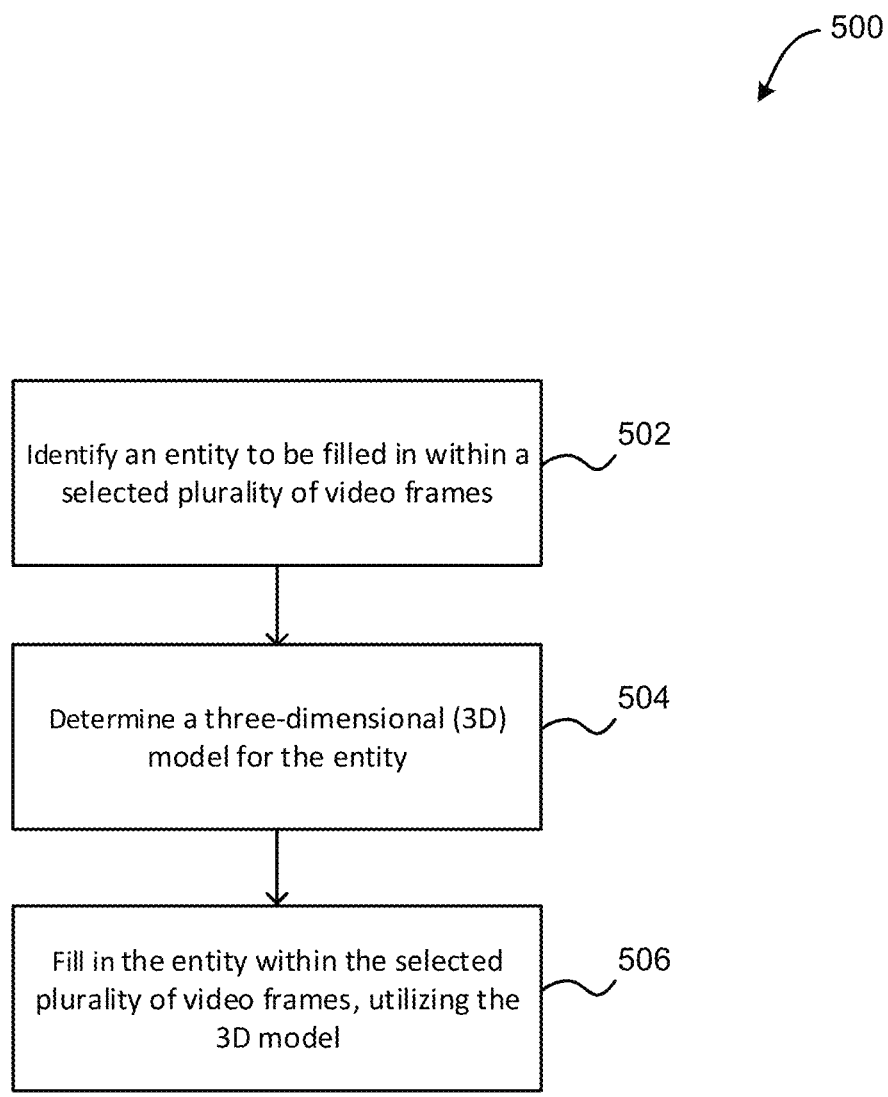
FIG. 5 illustrates a method for filling in an entity within a video, in accordance with one embodiment.

Now referring to FIG. 5, a flowchart of a method 500 for filling in an entity within a video is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an entity to be filled in is identified within a selected plurality of video frames. In one embodiment, the selected plurality of video frames may include all or a portion of a video. In another embodiment, the selected plurality of video frames may be selected by a user. In yet another embodiment, each of the selected plurality of video frames may include a still image.

Additionally, in one embodiment, the entity may be identified within a video editing application. In another embodiment, the entity may be identified in real-time during replay of the video. In yet another embodiment, the entity may include an object displayed within the selected plurality of video frames. For example, each of the selected plurality of video frames may display the object from a different angle of view when compared to the other selected plurality of video frames.

Further, in one embodiment, the entity may be included within a predetermined area of the selected plurality of video frames. In another embodiment, the predetermined area may be selected by a user. For example, the predetermined area may be selected by the user within the video editing application. In yet another embodiment, the entity may be identified utilizing one or more image recognition techniques. For example, the one or more image recognition techniques may be applied individually to each of the selected plurality of video frames.

Further still, in one embodiment, the entity may be identified from other video frames of the video. For example, the selected plurality of video frames may include only a portion of the total video frames of a video, and the other video frames may include video frames that come before and/or after the selected plurality of video frames within the video. In another example, the other video frames may be compared to the selected plurality of video frames to determine if the entity is located in one or more of the other video frames. In yet another example, upon determining that the entity is located within one or more of the other video frames, one or more image recognition techniques may be applied to the entity identified within the one or more other video frames.

In this way, entity identification may be enhanced, utilizing video frames appearing earlier or later than the selected plurality of video frames within the video.

Also, method 500 may proceed with operation 504, where a three-dimensional (3D) model is determined for the entity. In one embodiment, the edge detection may be used to determine one or more contours of the entity within the image. In another embodiment, one or more 3D models may be retrieved from a model library. In yet another embodiment, the models retrieved from the library may be refined to determine the 3D model. For example, the retrieved models may be refined utilizing information derived from other video frames of the video.

In addition, method 500 may proceed with operation 506, where the entity is filled in within the selected plurality of video frames, utilizing the 3D model. In one embodiment, a transformation may be applied to the 3D model. In another embodiment, the transformation may be used to project the 3D model onto a selected area within the selected plurality of video frames that needs to be filled. In yet another embodiment, each surface of the 3D model may be mapped to the selected plurality of video frames.

Furthermore, in one embodiment, a texture may be applied to the portions of the surface that need to be filled. In another embodiment, the texture may be learned from information derived from other video frames of the video. In yet another embodiment, one or more areas around the entity may also be filled in. In still another embodiment, the filling in of the entity and the one or more areas around the entity may result in a reconstructed entity within reconstructed video frames. In another embodiment, the reconstructed entity within the reconstructed video frames may be validated.

Figure 6:
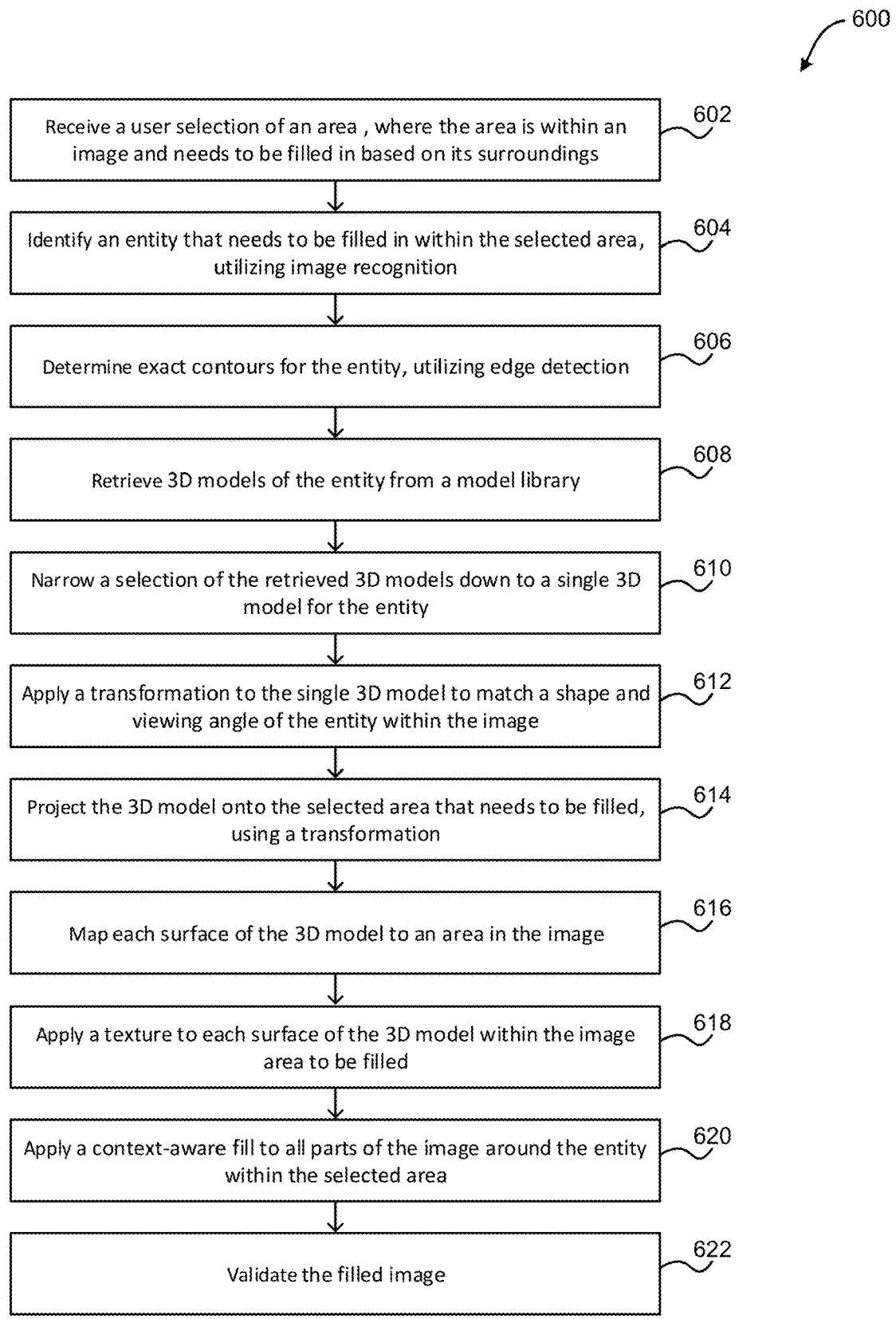
FIG. 6 illustrates a method for improving content-aware image filling using object recognition and 3D representations, in accordance with one embodiment.

Now referring to FIG. 6, a flowchart of a method 600 for improving content-aware image filling using object recognition and 3D representations is shown according to one embodiment. The method 600 may be performed in accordance with the present invention in any of the environments depicted in FIGS. 1-3, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a user selection of an area is received, where the area is within an image and needs to be filled in based on its surroundings. In one embodiment, the user may make the selection utilizing an image editing application. In another embodiment, the user may make the selection in real-time during a display of the image.

Additionally, method 600 may proceed with operation 604, where an entity that needs to be filled in within the selected area is identified, utilizing image recognition. In one embodiment, the image recognition may be performed utilizing one or more techniques (e.g., an image recognition service within the image editing application, etc.). In another embodiment, only entities that are poorly handled by other fill tools (e.g., entities with an irregular structure, etc.) may be identified to be filled in. In yet another embodiment, the entity may be identified as matching an available 3D model within a database. For example, if the entity does not match an available 3D model within the database, the entity may not be identified to be filled in.

Further, method 600 may proceed with operation 606, where exact contours for the entity are determined, utilizing edge detection. In one embodiment, the contours of the entity may be provided (entirely or partially) by the image recognition (e.g., an image recognition algorithm, etc.).

Further still, method 600 may proceed with operation 608, where 3D models of the entity are retrieved from a model library. In one embodiment, the 3D models may each include a wireframe model with optional textures. Also, method 600 may proceed with operation 610, where a selection of the retrieved 3D models is narrowed down to a single 3D model for the entity. In one embodiment, the selection may be narrowed utilizing geo tag data and a timestamp associated with the image.

For example, the geo tag data and timestamp data associated with the image may indicate that the image is a picture taken in Japan ten years ago, and the entity may be identified as an automobile. In response, the retrieved 3D models may then be limited to models of automobiles with a predetermined level of popularity within Japan ten years ago. In another example, the geo tag data and timestamp data associated with the image may help to determine time and location-appropriate clothing when the entity is identified as a person.

In addition, method 600 may proceed with operation 612, where a transformation is applied to the single 3D model to match a shape and viewing angle of the entity within the image. Furthermore, method 600 may proceed with operation 614, where the 3D model is projected onto the selected area that needs to be filled, using a transformation. Further still, method 600 may proceed with operation 616, where each surface of the 3D model is mapped to an area in the image. For example, when the entity is identified as an automobile, the surfaces may include one or more windows, doors, wheels, etc.

Also, method 600 may proceed with operation 618, where a texture is applied to each surface of the 3D model within the image area to be filled. In one embodiment, the texture may be learned from an existing texture of the same surface outside of the fill area. In another embodiment, the texture may be learned from other images. In yet another embodiment, the texture may be associated with the 3D model.

Additionally, method 600 may proceed with operation 620, where a context-aware fill is applied to all parts of the image around the entity within the selected area. Further, method 600 may proceed with operation 622, where the filled image is validated. In one embodiment, the reconstructed image may pass through an image recognition service to evaluate a quality of the filled area.

In this way, content-aware image filling may be performed on areas of an image that include recognizable entities with irregular structures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying an entity within a selected plurality of video frames that includes one or more missing portions;
determining a three-dimensional (3D) model for the entity;
filling in the one or more missing portions of the entity within the selected plurality of video frames to create a reconstructed entity, utilizing the 3D model, including:
applying a transformation to the 3D model to manipulate the model so that it matches a shape and viewing angle of the entity,
using the transformation to project the 3D model onto the one or more missing portions of the entity,
mapping each surface of the 3D model to the selected plurality of video frames, and
applying a texture to the one or more missing portions of the entity that need to be filled, where the texture is learned from a texture of an adjacent surface outside of the one or more missing portions; and
validating the reconstructed entity by:
performing image recognition on the reconstructed entity to obtain a first confidence score,
comparing the first confidence score to a second confidence score previously obtained for the selected plurality of video frames, and
determining a different 3D model for the entity in response to determining that the first confidence score is not greater than the second confidence score.

2. The computer-implemented method of claim 1, wherein the selected plurality of video frames include only a portion of a total number of video frames of a video, and the entity is identified from video frames that come before the selected plurality of video frames within the video.

3. The computer-implemented method of claim 1, further comprising correcting the selected plurality of video frames for distortion, wherein the missing portions result from the correcting.

4. The computer-implemented method of claim 1, wherein the selected plurality of video frames include only a portion of a total number of video frames of a video, and the entity is identified from video frames that come after the selected plurality of video frames within the video.

5. The computer-implemented method of claim 1, further comprising:
comparing the selected plurality of video frames to other video frames that come before and after the selected plurality of video frames within a video to determine if the entity is located in one or more of the other video frames; and
in response to determining that the entity is located within one or more of the other video frames, applying one or more image recognition techniques to the entity identified within the one or more of the other video frames.

6. The computer-implemented method of claim 1, wherein determining the 3D model includes using edge detection to determine one or more contours of the entity within the selected plurality of video frames.

7. The computer-implemented method of claim 1, wherein determining the 3D model includes retrieving a plurality of different 3D models from a model library.

8. The computer-implemented method of claim 7, wherein the plurality of different 3D models are retrieved utilizing metadata associated with the entity.

9. The computer-implemented method of claim 7, wherein the 3D model is selected from the plurality of different 3D models utilizing additional metadata associated with the selected plurality of video frames, the additional metadata including a date and time the selected plurality of video frames were created and a geographical location where the selected plurality of video frames were created.

10. The computer-implemented method of claim 1, wherein the entity is identified utilizing one or more image recognition techniques, and results of implementing the one or more image recognition techniques include metadata including an identification of the entity, a classification of the entity, and one or more specific characteristics of the entity.

11. A computer program product for filling in an entity within a video, the computer program product comprising a computer readable storage medium having program instructions embodied therewith, wherein the computer readable storage medium is not a transitory signal per se, the program instructions executable by a processor to cause the processor to perform a method comprising:
identifying the entity within a selected plurality of video frames that includes one or more missing portions, utilizing the processor;
determining a three-dimensional (3D) model for the entity, utilizing the processor;
filling in the one or more missing portions of the entity within the selected plurality of video frames to create a reconstructed entity, utilizing the 3D model and the processor, including:
applying a transformation to the 3D model to manipulate the model so that it matches a shape and viewing angle of the entity,
using the transformation to project the 3D model onto the one or more missing portions of the entity,
mapping each surface of the 3D model to the selected plurality of video frames, and
applying a texture to the one or more missing portions of the entity that need to be filled, where the texture is learned from a texture of an adjacent surface outside of the one or more missing portions; and
validating the reconstructed entity, utilizing the processor, by:
performing image recognition on the reconstructed entity to obtain a first confidence score,
comparing the first confidence score to a second confidence score previously obtained for the selected plurality of video frames, and determining a different 3D model for the entity in response to determining that the first confidence score is not greater than the second confidence score.

12. The computer program product of claim 11, wherein the selected plurality of video frames include only a portion of a total number of video frames of a video, and the entity is identified from video frames that come before the selected plurality of video frames within the video.

13. The computer program product of claim 11, wherein the selected plurality of video frames include only a portion of a total number of video frames of a video, and the entity is identified from video frames that come after the selected plurality of video frames within the video.

14. The computer program product of claim 11, further comprising:
   comparing, utilizing the processor, the selected plurality of video frames to other video frames that come before and after the selected plurality of video frames within a video to determine if the entity is located in one or more of the other video frames; and
   in response to determining that the entity is located within one or more of the other video frames, applying, utilizing the processor, one or more image recognition techniques to the entity identified within the one or more of the other video frames.

15. A system, comprising:
   a processor; and
   logic integrated with the processor, executable by the processor, or integrated with and executable by the processor, the logic being configured to:
      identify an entity within a selected plurality of video frames that includes one or more missing portions;
      determine a three-dimensional (3D) model for the entity;
      fill in the one or more missing portions of the entity within the selected plurality of video frames to create a reconstructed entity, utilizing the 3D model, including:
         applying a transformation to the 3D model to manipulate the model so that it matches a shape and viewing angle of the entity,
         using the transformation to project the 3D model onto the one or more missing portions of the entity,
         mapping each surface of the 3D model to the selected plurality of video frames, and
         applying a texture to the one or more missing portions of the entity that need to be filled, where the texture is learned from a texture of an adjacent surface outside of the one or more missing portions; and
      validate the reconstructed entity by:
         performing image recognition on the reconstructed entity to obtain a first confidence score,
         comparing the first confidence score to a second confidence score previously obtained for the selected plurality of video frames, and
         determining a different 3D model for the entity in response to determining that the first confidence score is not greater than the second confidence score.

* * * * *